(12) United States Patent  (10) Patent No.: US 7,391,934 B2
Goodall et al.  (45) Date of Patent: Jun. 24, 2008

(54) METHOD OF CREATING A SUBSTITUTE CHECK USING CHECK IMAGE DATA FROM A REMOTE CHECK IMAGE CAPTURE DEVICE AND AN APPARATUS THEREFOR

(75) Inventors: Ian C. Goodall, Kitchener (CA); Malon S. Updike, Dayton, OH (US)

(73) Assignee: NCR Corporation, Dayton, OH (US)

( * ) Notice: Subject to any disclaimer, the term of this patent is extended or adjusted under 35 U.S.C. 154(b) by 486 days.

(21) Appl. No.: 11/243,675

(22) Filed: Oct. 5, 2005

(65) Prior Publication Data

US 2007/0076940 A1 Apr. 5, 2007

(51) Int. Cl.
*G06K 9/60* (2006.01)
(52) U.S. Cl. .................. 382/305; 382/135; 382/137; 382/170
(58) Field of Classification Search .......... 382/135, 382/137, 140, 170
See application file for complete search history.

(56) References Cited

U.S. PATENT DOCUMENTS

| 6,464,134 | B1 * | 10/2002 | Page | 235/379 |
| 7,170,391 | B2 * | 1/2007 | Lane et al. | 340/5.82 |
| 7,185,805 | B1 * | 3/2007 | McShirley | 235/379 |
| 7,225,156 | B2 * | 5/2007 | Fisher et al. | 705/50 |
| 7,333,001 | B2 * | 2/2008 | Lane et al. | 340/10.1 |

* cited by examiner

*Primary Examiner*—Yosef Kassa
(74) *Attorney, Agent, or Firm*—Michael Chan

(57) ABSTRACT

A method is provided of an institution creating a substitute check using check image data from a remote check image capture device. The method comprises receiving from the remote check image capture device binary image data which is representative of a binary image of a check, receiving from the remote check image capture device grayscale image data which is representative of a grayscale image of the check, determining if the binary image of the check is usable, and creating a substitute check based upon the grayscale image data if the binary image of the check is determined to be unusable.

17 Claims, 8 Drawing Sheets

METHOD OF CREATING A SUBSTITUTE CHECK USING CHECK IMAGE DATA FROM A REMOTE CHECK IMAGE CAPTURE DEVICE AND AN APPARATUS THEREFOR

BACKGROUND

The present invention relates to substitute checks, and is particularly directed to a method of creating a substitute check using check image data from a remote check image capture device, such as an image-based check depositing automated teller machine (ATM), and an apparatus therefor.

A typical check depositing ATM allows an ATM customer to deposit a check (without having to place the check in any deposit envelope) in a public access, unattended environment. To deposit a check, an ATM customer inserts a customer identification card through a user card slot at the ATM, enters the amount of the check being deposited, and inserts the check through a check slot. A check transport mechanism receives the inserted check and transports the check in a forward direction along a check transport path to a number of locations within the ATM to process the check. If the check is not accepted for deposit, the check is returned to the ATM customer via the check slot. If the check is accepted for deposit, the amount of the check is deposited into the ATM customer's account and the check is transported to and stored in a storage bin within the ATM. An endorser printer prints an endorsement onto the check as the check is being transported to the storage bin.

Checks stored in the storage bin within the ATM are periodically (usually daily) picked up and physically transported via courier to a back office facility of a financial institution. At the back office facility, the checks are prepared at a document preparation workstation for subsequent processing in an image-based check processing system located at the back office facility. In a first pass of checks through the image-based check processing system, check image data which is representative of images of the checks is captured. Then in a second pass of checks through an image-based check processing system, the checks are encoded and sorted and matched up with their corresponding check image data which was previously captured during the first pass of checks. The second pass of checks may be made through either the same image-based check processing system that the first pass of checks was made or a different image-based check processing system. Checks are processed in the first and second passes through the image-based check processing system(s) for purpose of clearing checks between financial institutions, as is known.

As an alternative to capturing check image data in a first pass of checks through an image-based check processing system located at the back office facility (which requires the checks to be physically transported from the ATM to the back office facility before the first pass of checks can be performed), proposals have been made to initially capture check image data at the ATM. An image-based check depositing ATM is needed to capture check image data which is representative of checks deposited at the ATM. In a typical image-based check depositing ATM, check image data is initially captured in a "first pass" of checks through the ATM. The remotely-captured check image data is then sent electronically to the back office facility. At a later time (typically weekly), the checks may be picked up at the ATM and physically transported via courier to the back office facility. Then, in a "second pass" of checks through an image-based check processing system located at the back office facility, the checks are matched up with their corresponding check image data which was previously captured at the ATM. The checks are then further processed as required.

From time to time, a check image represented by check image data which has been captured in the "first pass" through the image-based check depositing ATM may be of suspect image quality. For example, after the remotely-captured check image data has been sent electronically to the back office facility, an operator at the back office facility may determine that the quality of the image represented by the check image data is of insufficient quality. If this should occur in known image-based check depositing ATMs, a service operator may need to be dispatched to the particular ATM to retrieve the particular check and process the retrieved check as an exception item through a normal exception processing infrastructure. The cost of dispatching a service operator to an ATM to retrieve a particular check, so that the retrieved check can be processed as an exception item, is usually relatively high. It would be desirable to reduce the number of service trips which need to be made by service operators to remote check image capture devices such as image-based check depositing ATMs.

SUMMARY

In accordance with an embodiment of the present invention, a method is provided of an institution creating a substitute check using check image data from a remote check image capture device. The method comprises receiving from the remote check image capture device binary image data which is representative of a binary image of a check, receiving from the remote check image capture device grayscale image data which is representative of a grayscale image of the check, determining if the binary image of the check is usable, and creating a substitute check based upon the grayscale image data if the binary image of the check is determined to be unusable.

DETAILED DESCRIPTION

The present invention is directed to a method of creating a substitute check using check image data from a remote check image capture device and an apparatus therefor.

Figure 1:
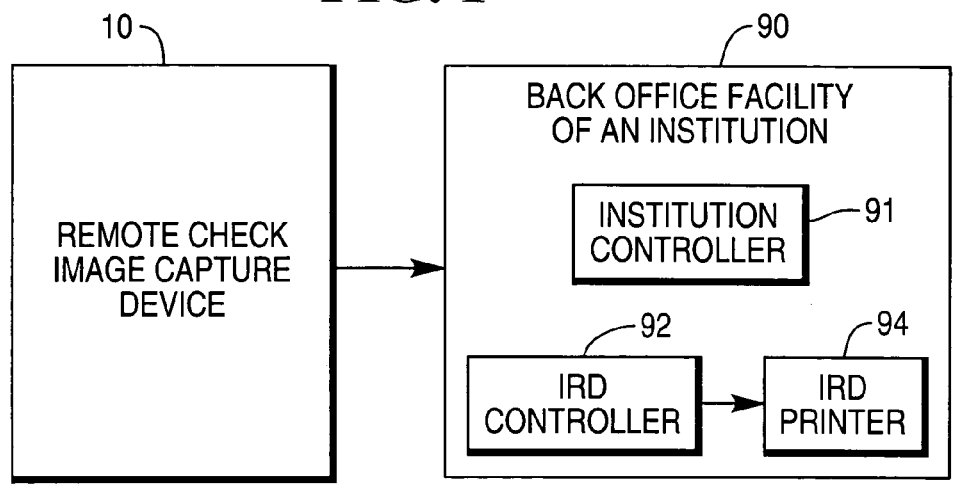
FIG. 1 is a block diagram of a remote check image capture device and a back office facility of an institution.
Figure 2:
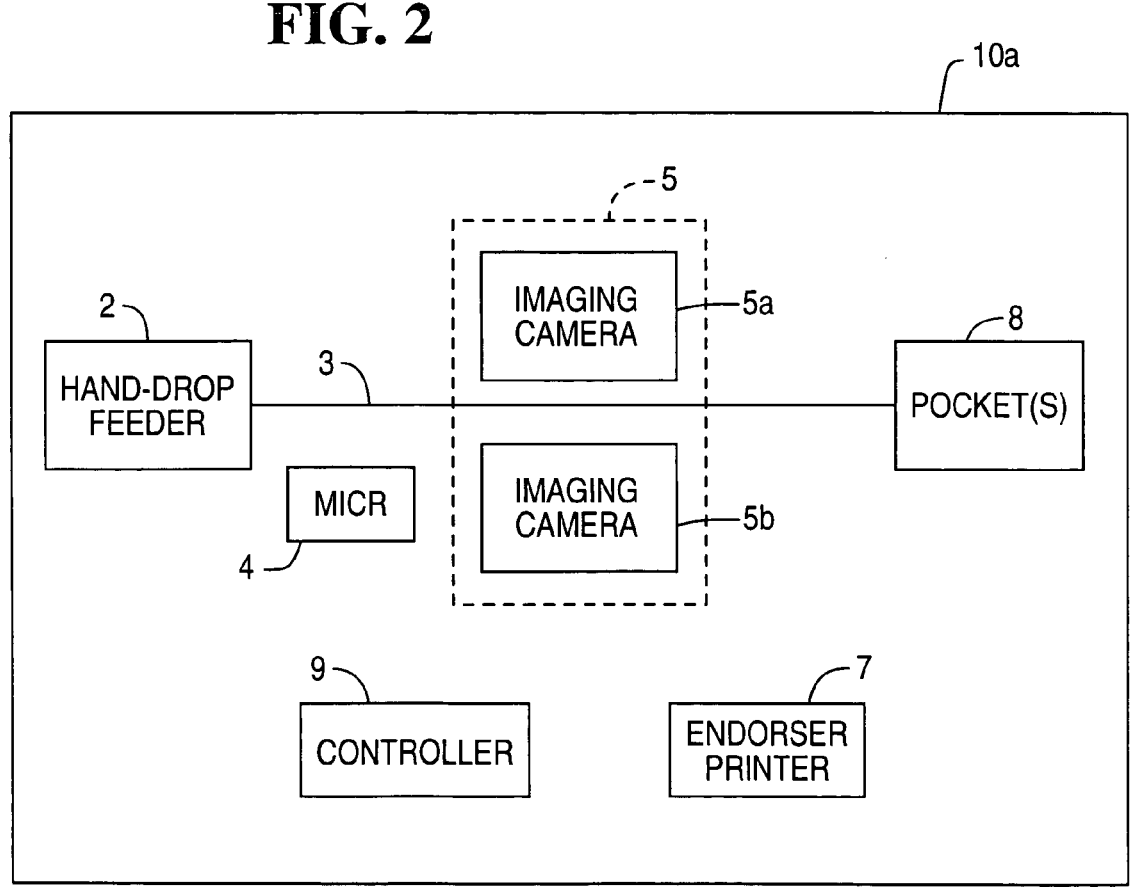
FIG. 2 is a block diagram showing one form (a table-top check processing terminal) of the remote check image capture device of FIG. 1.

Referring to FIG. 1, a back office facility 90 of an institution has an institution controller 91 and an image replacement document (IRD) controller 92 which controls operation of an IRD printer 94. The controller 91 receives check image data from a remote check image capture device 10, and processes some of this check image data in known conventional manner and some of this data in accordance with embodiments of the present invention, as will be described later. There are many forms that the remote check image capture device 10 may take. One example of the remote check image capture device 10 is in the form of a table-top check processing terminal 10a as shown in FIG. 2. The terminal 10a may be located at a bank branch, for example, where bank personnel use the terminal to perform check processing functions. As another example, the terminal 10a may be located at a commercial client's facility where check image capture processing is performed.

The table-top terminal 10a comprises the following elements: a hand-drop check feeder 2, a check transport mechanism 3 including an alignment mechanism for aligning a check; a magnetic ink recognition character (MICR) head 4 for reading magnetic details on a code line of a check; an imager 5 including a first imaging camera 5a and a second imaging camera 5b for capturing a grayscale image of each side of a check (front and rear); a printer 7 for endorsing a check; and a number of check storage bins 8 in the form of pockets for storing processed checks. An automated check feeder may be used instead of the hand-drop check feeder 2. Also, the use of the MICR head 4 in some applications may be optional. The elements are conventional and will not be described in detail herein. The terminal 10a also includes a controller 9 for controlling the operation of the elements within the terminal.

Figure 3:
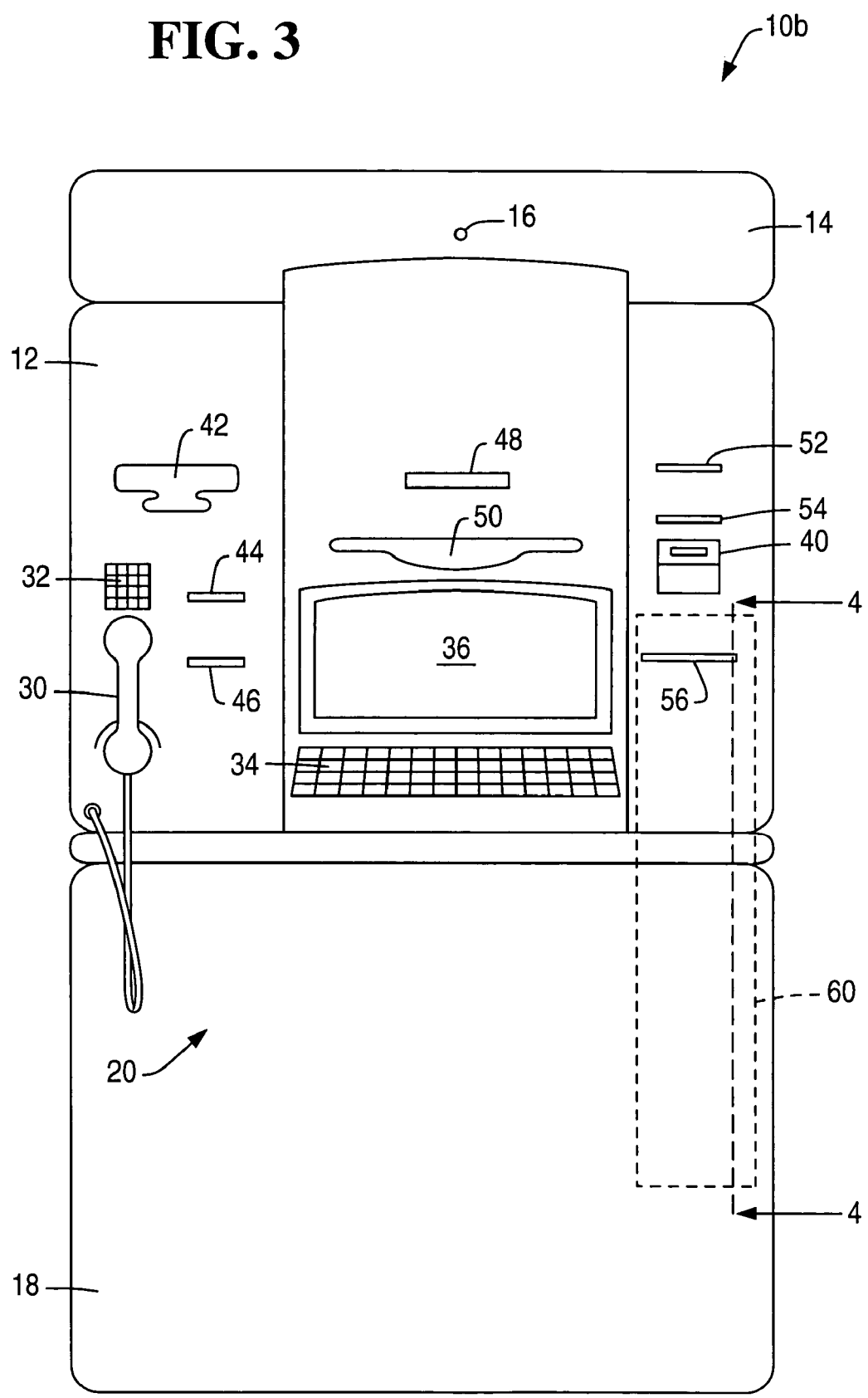
FIG. 3 is a pictorial diagram of another form (an image-based check depositing ATM) of the remote check image capture device of FIG. 1.

Another example of the remote check image capture device 10 is in the form of an image-based self-service depositing terminal, such as an image-based check depositing ATM 10b as shown in FIG. 3, at which a check can be deposited. The check depositing ATM 10b comprises a fascia 12 pivotably coupled to a chassis (not shown), an upper panel 14 mounted to the chassis and defining an aperture 16 through which a camera (not shown) images a customer of the ATM 10b, and a lower panel 18 hingeably coupled to the chassis so that the lower panel 18 can be opened to reveal a safe (not shown) mounted in the chassis. When the lower panel 18 is open, the fascia 12 can be pivoted upwards to reveal ATM modules mounted within the chassis.

The fascia 12 and lower panel 18 provide a user interface 20 for allowing an ATM customer to execute a transaction. The fascia 12 includes a handset 30 and a telephone keypad 32 for allowing an ATM customer to contact a remote operator (not shown) typically located in a call center (not shown). The fascia 12 also includes an encrypting keyboard 34 for allowing an ATM customer to enter transaction details, and a display 36 for presenting screens to an ATM customer. The fascia 12 also defines eight slots for receiving and dispensing media items, and a tray 40 into which coins can be dispensed. The slots include a money order printer slot 42, a bunch note input slot 44, a bunch note exit slot 46, a statement output slot 48, a cash dispense slot 50, a card reader slot 52, a card issue slot 54, and a check input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) 5878 financial services center ATM, available from NCR Financial Solutions Group Limited, Discovery Centre, 3 Fulton Road, Dundee, DD2 4SW, Scotland.

Figure 4:
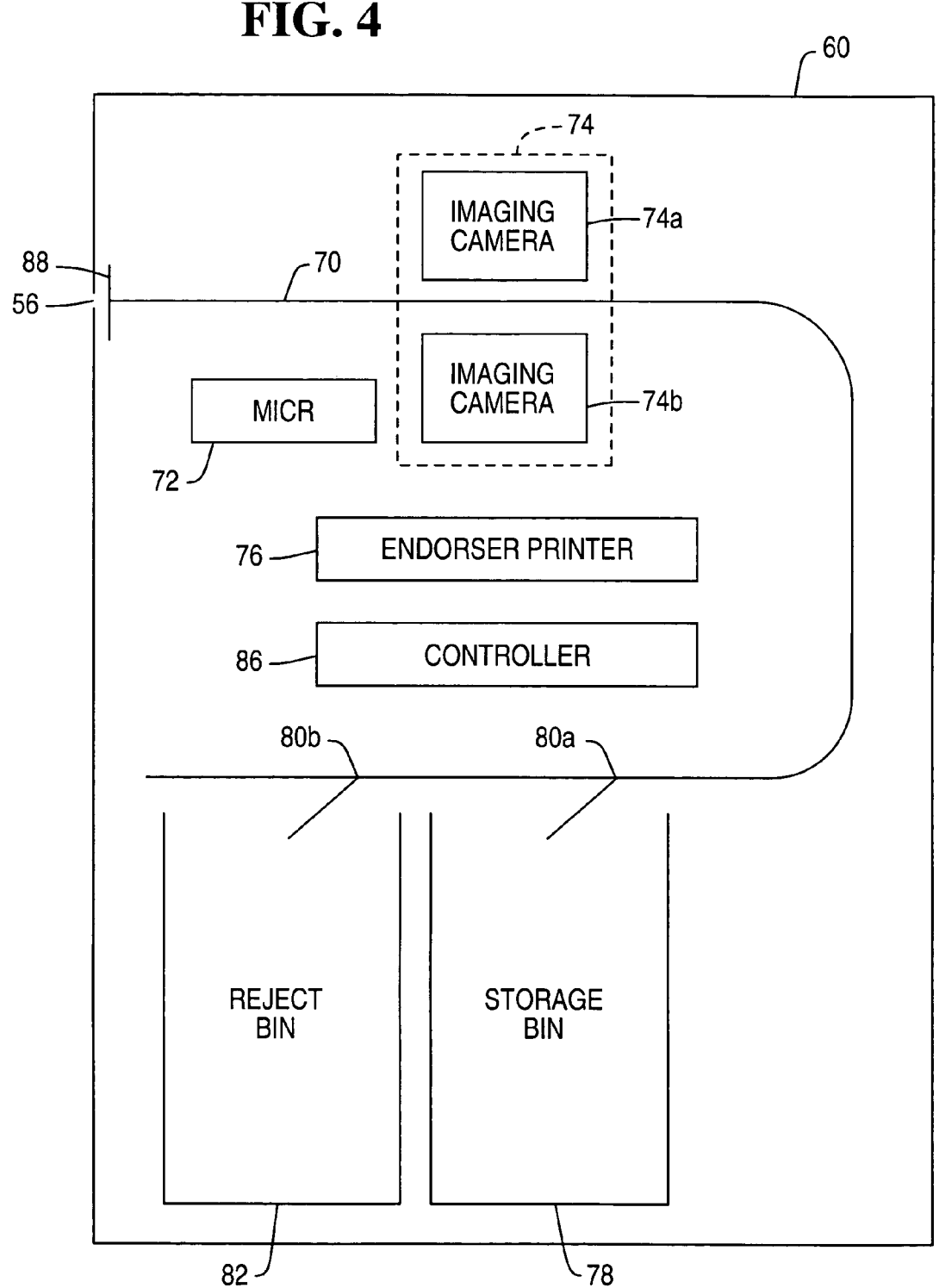
FIG. 4 is a simplified schematic sectional diagram, taken approximately along line 4-4 in FIG. 3, and showing a part (a check processing module) of the ATM of FIG. 3.
Figure 5:
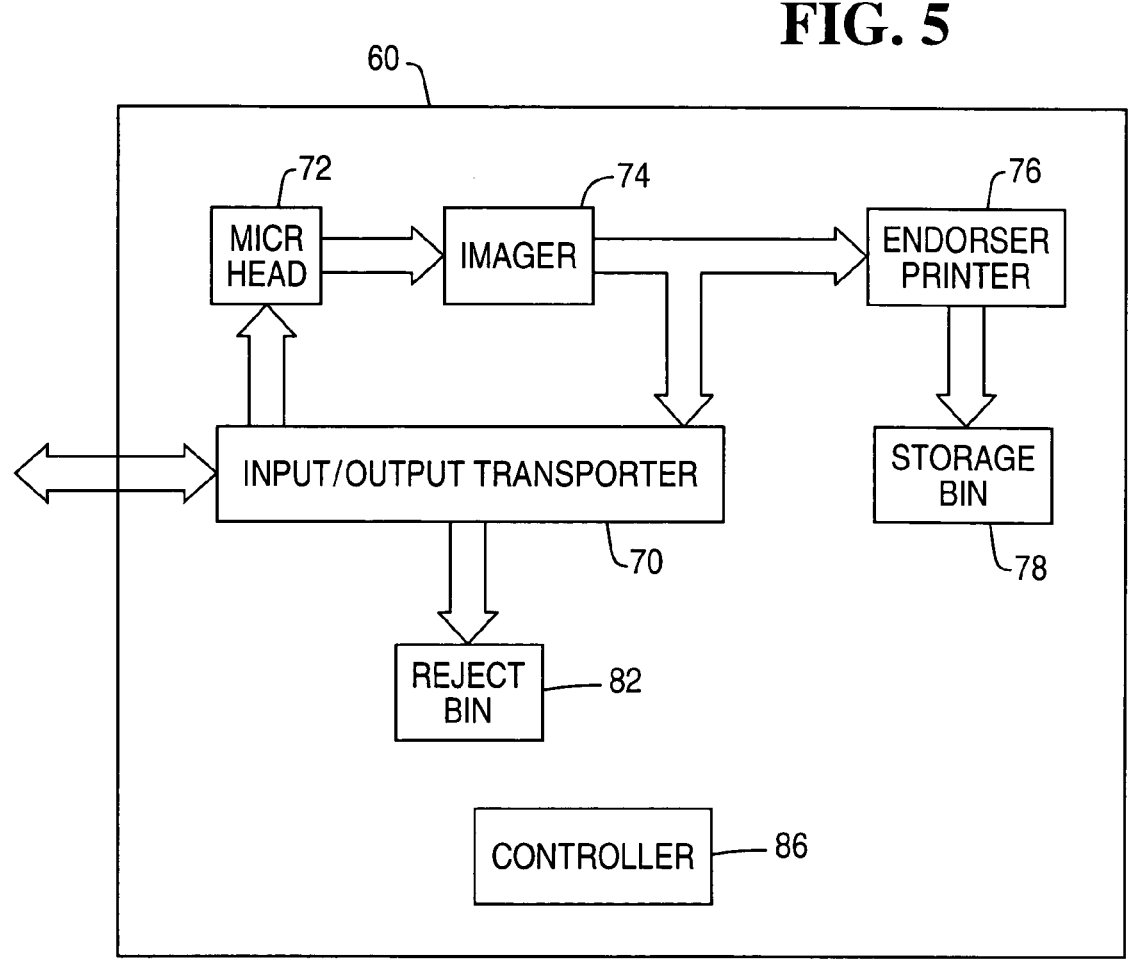
FIG. 5 is a block diagram of the check processing module of FIG. 4.

A check processing module (CPM) 60 will now be described with reference to FIG. 4 and FIG. 5. FIG. 4 is a simplified schematic sectional diagram (along line 4-4 in FIG. 3) showing part of the fascia 12 and lower panel 18, and the main parts of the CPM 60. FIG. 5 is a block diagram illustrating the main elements in the CPM 60. The CPM 60 is a modified version of a conventional check processing module, such as the check processing module provided with the PERSONAS (trade mark) 5878 NCR ATM.

The CPM 60 comprises the following elements: a check input/output transport mechanism 70 including an alignment mechanism for aligning a check; a MICR head 72 for reading magnetic details on a code line of a check; an imager 74 including an upper 74a and lower 74b imaging camera for capturing a grayscale image of each side of a check (front and rear); a printer 76 for endorsing a check; a storage bin 78 for storing processed checks; and a reject bin 82 for storing rejected checks. The transport mechanism 70 includes two divert gates 80a, 80b for diverting checks to either the storage bin 78 or the reject bin 82. The elements are conventional and will not be described in detail herein. The CPM 60 also includes a controller 86 for controlling the operation of the elements within the CPM 60. The CPM 60 also includes a slot entrance shutter 88 for opening and closing the check input/output slot 56.

Figure 6A:
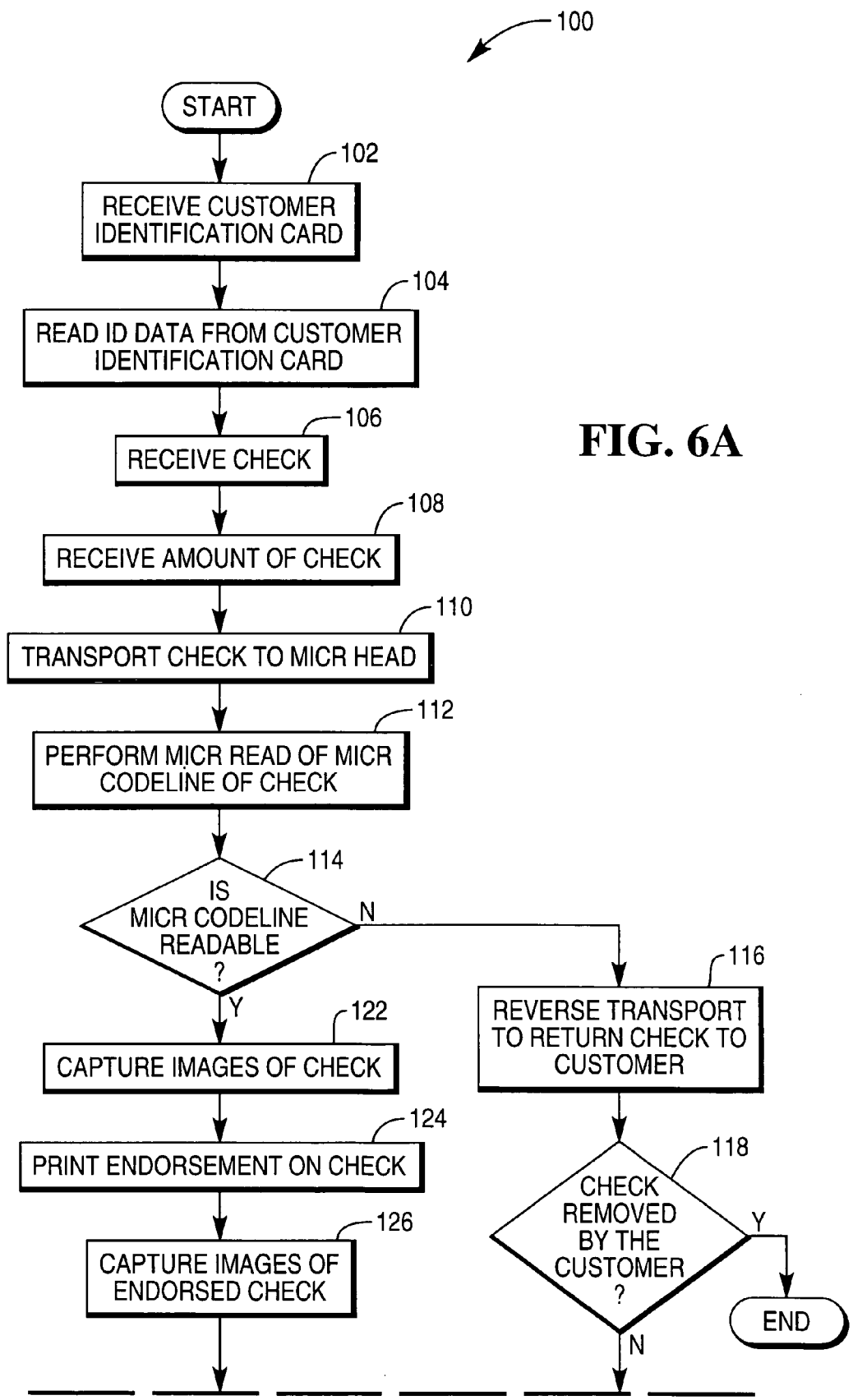
FIG. 6 is a flowchart illustrating steps involved in a check depositing operation.
Figure 6B:
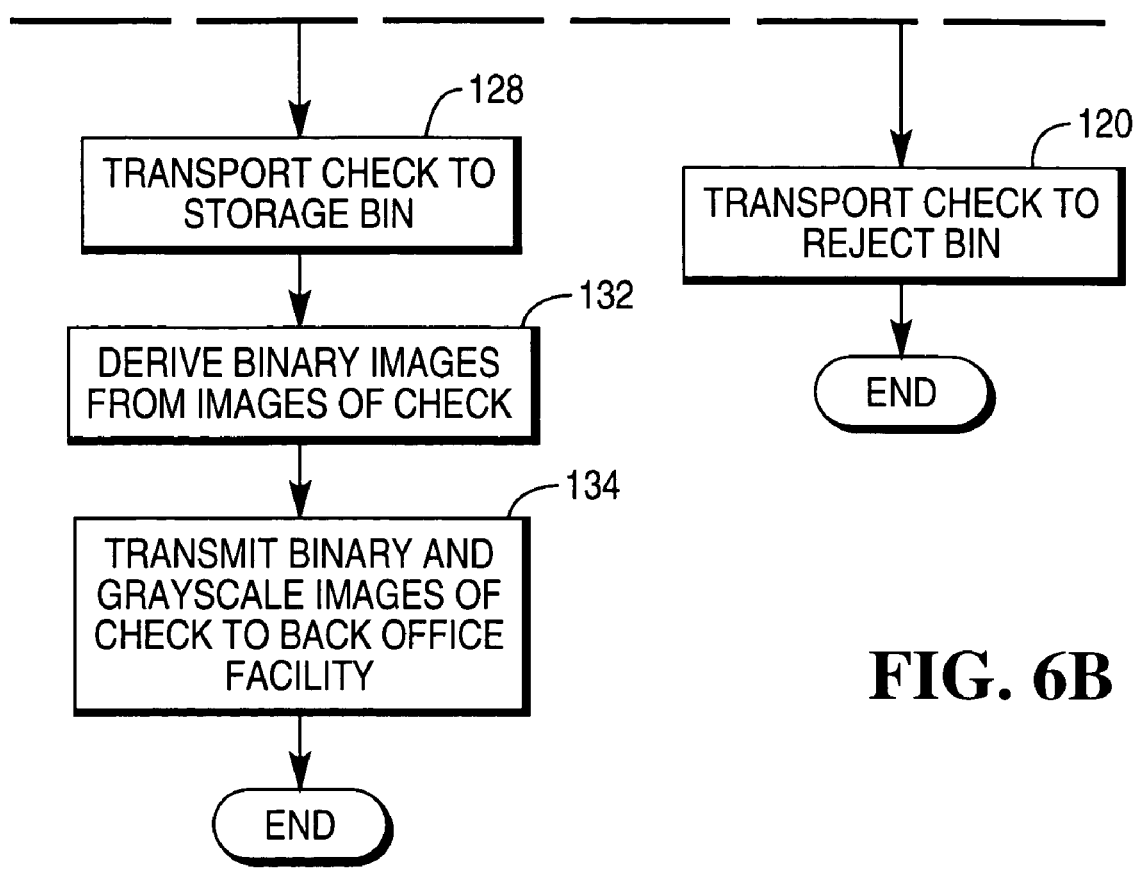

A typical check depositing transaction will now be described with reference to FIG. 6 which is a flowchart 100 illustrating the steps involved in a check depositing transaction, and also with reference to FIGS. 3 to 5. In this transaction, the ATM customer enters a customer identification card into the card reader slot 52 (steps 102 and 104), selects "check depositing" from a list of transaction options presented on the display 36, enters the amount of the check via the keyboard 34, and inserts the check to be deposited through the check input/output slot 56 (step 106). The controller 86 receives the amount of the check (step 108), and opens the slot entrance shutter 88. The transport mechanism 70 receives the check and transports the received check (step 110) to the MICR head 72 where the MICR codeline on the check is read (step 112).

A determination is made (step 114) as to whether the MICR codeline can be read from the check. If the MICR codeline data from the check is unreadable as determined in step 114, then a check return operation is initiated. When this occurs, the transport mechanism 70 reverses the direction of transport (step 116) to convey the check to the check input/output slot 56 to return the check to the ATM customer via the check input/output slot. The controller 86 may monitor the slot 56 to ensure that the check has been removed by the ATM customer (step 118). If the ATM customer has not removed the check within a predetermined time period, the check is retracted and conveyed to the reject bin 82 (step 120).

However, if the MICR codeline data from the check is readable as determined in step 114, then the transport mechanism 70 transports the check to the imager 74, where both sides of the check are imaged (step 122). The printer 76 prints endorsement data onto the check (step 124). The check is then transported to the imager 74 to image the endorsed check (step 126) before it is transported to the storage bin 78 (step 128) for subsequent collection and further processing. Although the above describes both steps 122 and 126 being performed, it is conceivable that only one of these steps be performed. Preferably, step 122 is performed, and step 126 is optionally performed.

The captured check images are grayscale images of the check. Binary images are derived from the grayscale images of the check (step 132). A front binary image is derived from the front grayscale image, and a rear binary image is derived from the rear grayscale image. There are known techniques to derive binary images from grayscale images. Accordingly, details of such techniques will not be discussed. The grayscale images and the binary images derived in step 132 are electronically transmitted to the back office facility 90 of the institution (step 134), such as a financial institution in the form of a bank, for further processing at the back office facility. This institution may or may not own the particular ATM at which the check has been deposited.

Figure 7A:
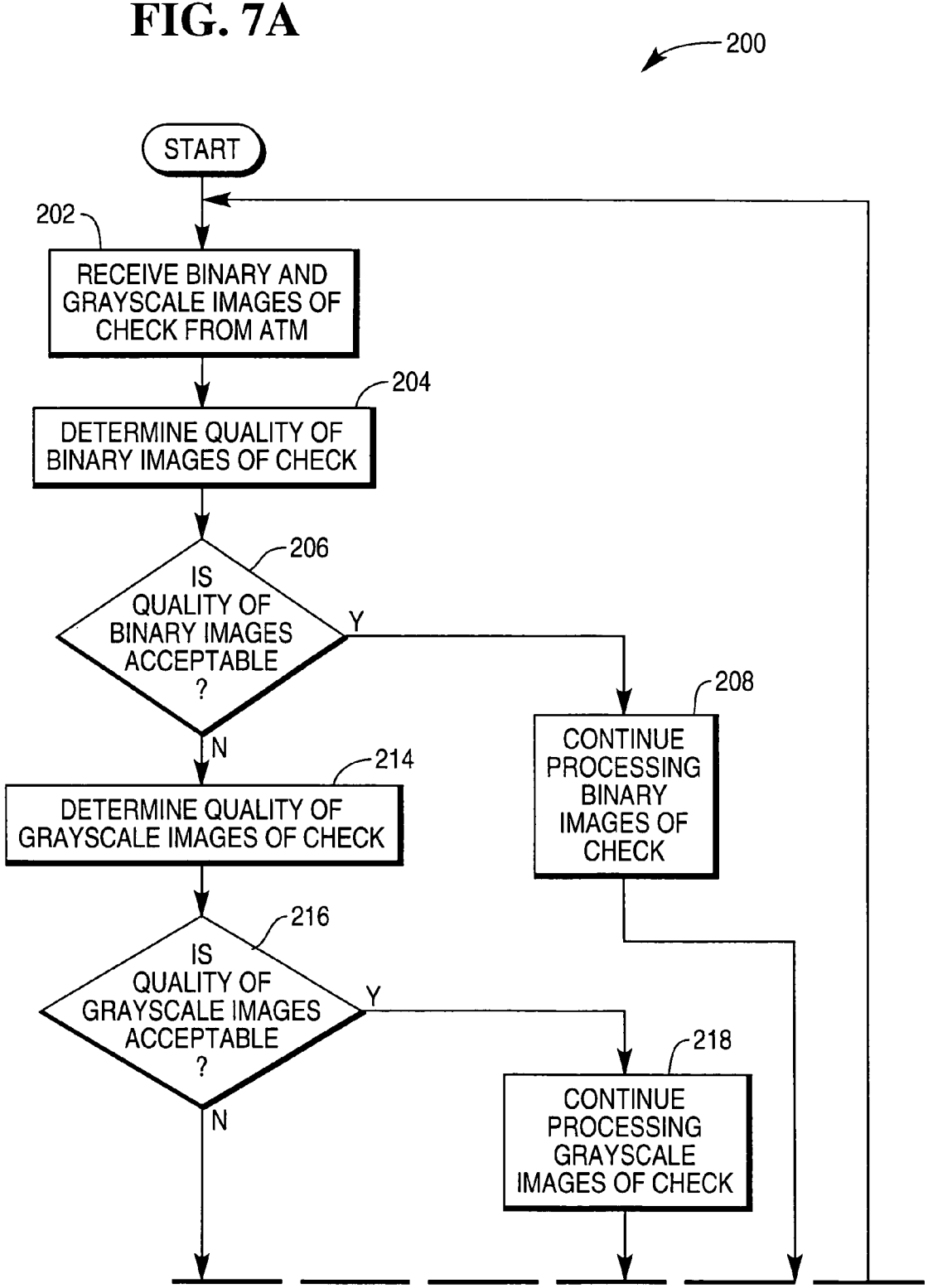
FIG. 7 is a flowchart illustrating steps involved at the back office facility of the institution of FIG. 1.
Figure 7B:
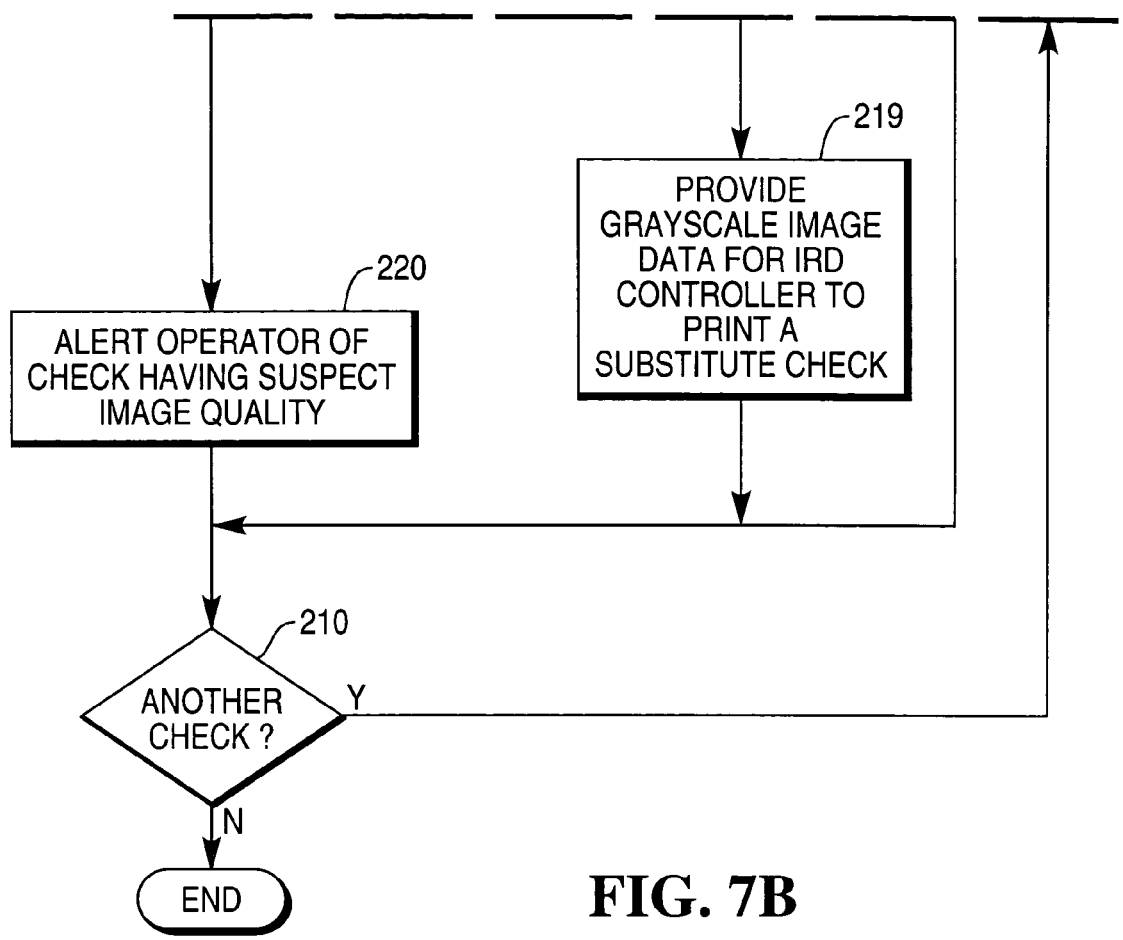

Referring to FIG. 7, a flowchart 200 which illustrates steps performed at the back office facility 90 of the institution. In step 202, the controller 91 receives the grayscale check images and the binary check images from the ATM 10*b*. The quality of the binary check images is determined in step 204. There are known techniques to determine quality of the binary check images. Accordingly, details of such techniques will not be discussed. The specific manner in which the quality of the binary check images is determined is not important to different embodiments of the present invention.

A determination is made in step 206 as to whether the quality of the binary check images is acceptable. If the determination in step 206 is affirmative, the binary check images are processed in usual normal manner (step 208). A determination is then made in step 210 as to whether there is another check to be processed. If affirmative, the next check is processed starting again at step 202.

However, if the determination in step 206 is negative, the quality of the retrieved grayscale check images is determined in step 214. There are known techniques to determine quality of the grayscale check images. Accordingly, details of such techniques will not be discussed. One example is that the quality of the grayscale check images is manually determined by an operator viewing the grayscale check images on a display screen. The specific manner in which the quality of the grayscale check images is determined is not important to different embodiments of the present invention.

A determination is then made in step 216 as to whether the quality of the grayscale check images is acceptable. If the determination in step 216 is affirmative, the grayscale check images are processed (step 218) in a manner so that the corresponding check associated with these grayscale check images need not have to be processed as an exception item (step 218). In particular, as shown in step 219, the controller 91 provides the grayscale image data which is representative of grayscale images of the check to the IRD controller 4. The IRD controller 4 processes the grayscale image data, and controls the IRD printer 6 so that the IRD printer prints a substitute check based upon the grayscale image data. A substitute check is also referred to as an image replacement document (i.e., an IRD).

The creation of a substitute check is defined by American National Standards Institute (ANSI) X9.100-140 standard. This standard defines the content of a substitute check using the front and back images of an original check and data associated with the check. It should be noted that there are a number of ways in which the substitute check can be printed. A typical printing arrangement includes a controller and a printer, such as shown in block diagram format as the reference numerals 92 and 94, respectively, in FIG. 1. As an alternative, a third party check processing service provider may be used to print substitute checks. The specific way in which a substitute check is printed is not important to different embodiments of the present invention. A determination is then made in step 210 as to whether there is another check to be processed. If affirmative, the next check is processed starting again at step 202.

However, if the determination in step 216 is negative, the grayscale check images are presented to an operator (step 220) to alert the operator that the corresponding physical check associated with these grayscale check images may need to be processed as an exception item since the grayscale check images are not determined to be of acceptable quality. The operator then takes steps to determine if a service operator needs to be dispatched to the particular ATM (in this case the ATM 10*b*) to retrieve the corresponding physical check. A determination is then made in step 210 as to whether there is another check to be processed. If affirmative, the next check is processed starting again at step 202.

It should be noted though that in the majority of instances where the image quality of a binary image of a check is determined to be suspect and/or problematic, the corresponding grayscale image is usable. It should also be noted that if a binary image of a check is determined to be of unacceptable quality, the current requirement is that the physical check needs to be retrieved and exchanged. Accordingly, it should be apparent that a method according to an embodiment of the present invention, as described hereinabove, is especially useful for an institution (such as a collecting bank) in an image exchange environment which supports the exchange of binary images of checks but does not support the exchange of grayscale images of checks.

When grayscale images of checks cannot be exchanged and the image quality of a binary image of a check is determined to be suspect and/or problematic, the collecting bank can simply use grayscale image data which is representative of a grayscale image of the check to print a grayscale IRD (i.e., a substitute check). The collecting bank then sends the substitute check as a forward presentment item to a paying bank. Thus, it becomes unnecessary for the collecting bank to send an operator to the location of the remote check image capture device (in this example the ATM 10*b*) to retrieve the physical check for exchange.

Although the above-description describes a check being deposited in its entire amount by an ATM customer, it is conceivable that the check may be deposited only in partial amount of the entire amount of the check at the ATM 10*b*, with the remaining amount of the check being cashed and delivered to the ATM customer. Checks may be of different sizes, different thicknesses, or different weights of paper.

Also, although the above-description describes the PERSONAS (trade mark) 5878 NCR ATM embodying the present invention, it is conceivable that other models of ATMs, other types of ATMs, or other types of self-service terminals may embody the present invention. Self-service terminals are generally public-access devices that are designed to allow a user to conduct a transaction or to access information in an unassisted manner and/or in an unattended environment. Self-service terminals typically include some form of tamper resistance so that they are inherently resilient. Self-service terminals allow users to obtain information or to conduct a transaction. Self-service terminals include: ATMs; non-cash kiosks that allow users to access information (e.g., to view reward points on a reward card the user inserts into the self-service terminal); and kiosks that accept payment for services (e.g. Web surfing kiosks, kiosks that allow users to buy goods, etc.). The term self-service terminal has a relatively broad meaning and includes vending machines.

Further, although the above-description describes the remote check image capture device 10 (FIG. 1) as being in the form of the image-based check depositing ATM 10*b* (FIG. 3), the remote check image capture device may be in other forms. As previously mentioned with reference to FIG. 2, the remote check image capture device 10 may comprise a table-top check processing terminal 10*a* which is located at a bank branch or at a commercial client's facility at which check image capture processing is performed. These locations are only examples of where the table-top check processing terminal 10a can be used. The table-top check processing terminal 10a may be used in other locations at which grayscale images of original physical checks are captured. As another example, the table-top check processing terminal 10a may be located at a first bank (which may be a relatively smaller bank), and the back office facility for processing or clearing checks may comprise a second bank (which may be a relatively larger bank). Still as another example, the table-top check processing terminal 10a may be located at any type of bank, and the back office facility may comprise a third party check processing service provider.

The location of the remote check image capture device 10 is remote from the back office facility 90 such that it would be relatively costly for a service operator to be dispatched to the location of the remote check image capture device to retrieve a physical check. The remote check image capture device 10 is located at the point of presentment of an original check. The point of presentment is distant and away from the paper or check clearing facility which processes checks.

The particular arrangements disclosed are meant to illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of an institution creating a substitute check using check image data from a remote check image capture device, the method comprising:
    receiving from the remote check image capture device binary image data which is representative of a binary image of a check;
    receiving from the remote check image capture device grayscale image data which is representative of a grayscale image of the check;
    determining if the binary image of the check is usable; and
    creating a substitute check based upon the grayscale image data if the binary image of the check is determined to be unusable.

2. A method according to claim 1, wherein (i) the institution comprises a back office facility of a bank, and (ii) the remote check image capture device comprises a table-top check processing terminal located at a commercial client's check image capture facility which is located remote from the back office facility of the bank.

3. A method according to claim 1, wherein (i) the institution comprises a back office facility of a bank, and (ii) the remote check image capture device comprises a table-top check processing terminal located at a bank branch which is located remote from the back office facility of the bank.

4. A method according to claim 1, wherein (i) the institution comprises a third party check processing service provider, and (ii) the remote check image capture device comprises a terminal located at a bank which uses the third party check processing service provider to process checks.

5. A method according to claim 1, wherein (i) the institution comprises a first bank at which checks can be processed, and (ii) the remote check image capture device comprises a terminal located at a second bank which is different from the first bank and which uses the first bank to process checks.

6. A method according to claim 1, wherein the remote check image capture device comprises an image-based self-service depositing terminal.

7. A method according to claim 6, wherein the image-based self-service depositing terminal comprises an image-based check depositing automated teller machine (ATM).

8. A method according to claim 1, wherein the grayscale image data includes (i) a grayscale image data portion which is representative of a grayscale image of the front of the check, and (ii) a grayscale image data portion which is representative of a grayscale image of the rear of the check.

9. A method of a back office facility creating a substitute check using check image data from a remote check image capture device, the method comprising:
    receiving from the remote check image capture device binary image data which is representative of a binary image of a check;
    receiving from the remote check image capture device grayscale image data which is representative of a grayscale image of the check;
    determining if the binary image of the check is suspect; and
    creating a substitute check based upon the grayscale image data if the binary image of the check is determined to be suspect.

10. A method according to claim 9, wherein (i) the back office facility comprises a back office facility of a bank, and (ii) the remote check image capture device comprises a table-top check processing terminal located at a commercial client's check image capture facility which is located remote from the back office facility of the bank.

11. A method according to claim 9, wherein (i) the back office facility comprises a back office facility of a bank, and (ii) the remote check image capture device comprises a table-top check processing terminal located at a bank branch which is located remote from the back office facility of the bank.

12. A method according to claim 9, wherein (i) the back office facility comprises a third party check processing service provider, and (ii) the remote check image capture device comprises a terminal located at a bank which uses the third party check processing service provider to process checks.

13. A method according to claim 9, wherein (i) the back office facility comprises a back office facility of a first bank at which checks can be processed, and (ii) the remote check image capture device comprises a terminal located at a second bank which is different from the first bank and which uses the back office facility of the first bank to process checks.

14. A method according to claim 9, wherein the remote check image capture device comprises an image-based self-service depositing terminal.

15. A method according to claim 14, wherein the image-based self-service depositing terminal comprises an image-based check depositing automated teller machine (ATM).

16. An apparatus comprising:
    a printer;
    a first controller for (i) receiving from a remote check image capture device binary image data which is representative of a binary image of a check, and (ii) receiving from the remote check image capture device grayscale image data which is representative of a grayscale image of the check; and
    a second controller for (i) receiving grayscale image data from the first controller, and (ii) controlling the printer to print a substitute check based upon grayscale image data received from the first controller when the binary image of the check is unusable.

17. An apparatus according to claim 16, wherein (i) the second controller comprises an image replacement document (IRD) controller, and (ii) the printer comprises an IRD printer.

* * * * *